US012706333B2

(12) United States Patent
Suganuma et al.

(10) Patent No.: US 12,706,333 B2
(45) Date of Patent: Aug. 11, 2026

(54) VALUABLE MATTER RECOVERY METHOD

(71) Applicant: DOWA ECO-SYSTEM CO., LTD., Tokyo (JP)

(72) Inventors: Yoji Suganuma, Tokyo (JP); Hiroki Nagahara, Tokyo (JP); Minoru Yoshihara, Tokyo (JP); Chihiro Nishikawa, Tokyo (JP); Ryoei Watanabe, Tokyo (JP); Yoshihiro Honma, Tokyo (JP); Masataka Yamashita, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 437 days.

(21) Appl. No.: 18/024,825

(22) PCT Filed: Sep. 3, 2021

(86) PCT No.: PCT/JP2021/032511
§ 371 (c)(1),
(2) Date: Mar. 6, 2023

(87) PCT Pub. No.: WO2022/054723
PCT Pub. Date: Mar. 17, 2022

(65) Prior Publication Data

US 2023/0318063 A1 Oct. 5, 2023

(30) Foreign Application Priority Data

Sep. 9, 2020 (JP) ................................ 2020-151516

(51) Int. Cl.
*H01M 10/54* (2006.01)
*B09B 3/40* (2022.01)
(Continued)

(52) U.S. Cl.
CPC ............... *H01M 10/54* (2013.01); *B09B 3/40* (2022.01); *C22B 7/005* (2013.01); *C22B 15/0013* (2013.01); *C22B 21/0092* (2013.01)

(58) Field of Classification Search
CPC ..... H01M 10/54; H01M 10/0525; B09B 3/40; B09B 2101/16; B09B 3/35; C22B 7/005;
(Continued)

(56) References Cited

U.S. PATENT DOCUMENTS 1,628,273 A 5/1927 Richardson
7,328,697 B2 * 2/2008 Turner ..................... F24C 1/14 126/91 A
(Continued)

FOREIGN PATENT DOCUMENTS

CN 102583310 7/2012
CN 107532231 1/2018
(Continued)

OTHER PUBLICATIONS

Nakamura Mitsui, et.al. [JP7017860B2] (Text relies on Machine translation, and Figure from original). (Year: 2018).*
(Continued)

*Primary Examiner* — Sally A Merkling
*Assistant Examiner* — Nazmun Nahar Shams
(74) *Attorney, Agent, or Firm* — Greenblum & Bernstein, P.L.C.

(57) ABSTRACT

A method for recovering a valuable substance is provided. The method includes: a thermal treatment step of thermally treating a target containing a valuable substance while supporting a target storing unit, in which the target is stored, by a supporting unit that can support the target storing unit, wherein the thermally treating includes heating a gas present in a region, in which the supporting unit is positioned, by a flame for thermally treating the target such that the target
(Continued)

100 storing unit is not contacted by the flame; and a valuable substance recovering step of recovering the valuable substance from a thermally treated product of the target obtained in the thermal treatment step.

10 Claims, 2 Drawing Sheets

(51) Int. Cl.
*C22B 7/00* (2006.01)
*C22B 15/00* (2006.01)
*C22B 21/00* (2006.01)

(58) Field of Classification Search
CPC ... C22B 15/0013; C22B 21/0092; C22B 7/00; C22B 7/004; C22B 15/00; C22B 1/02; Y02P 10/20; Y02W 30/84
USPC .......................................................... 75/10.67
See application file for complete search history.

(56) References Cited

U.S. PATENT DOCUMENTS

| | | | | |
|---|---|---|---|---|
| 8,157,887 | B2 | 4/2012 | Frame | |
| 2006/0246391 | A1 | 11/2006 | Gaur et al. | |
| 2009/0314134 | A1* | 12/2009 | Iida | H01M 10/425 75/10.67 |
| 2012/0024111 | A1* | 2/2012 | Bratina | F27B 9/26 75/401 |
| 2018/0083325 | A1 | 3/2018 | Usui et al. | |
| 2019/0386354 | A1* | 12/2019 | Muraoka | H01M 10/54 |
| 2020/0136201 | A1 | 4/2020 | Usui et al. | |
| 2023/0323506 | A1 | 10/2023 | Nishikawa et al. | |
| 2023/0366061 | A1 | 11/2023 | Nishikawa et al. | |

FOREIGN PATENT DOCUMENTS

| | | |
|---|---|---|
| JP | 8-217401 | 8/1996 |
| JP | 2010-3512 | 1/2010 |
| JP | 2011-117270 | 6/2011 |
| JP | 2013-64177 | 4/2013 |
| JP | 2015-170480 | 9/2015 |
| JP | 2016-22395 | 2/2016 |
| JP | 2016-207648 | 12/2016 |
| JP | 2016-219402 | 12/2016 |
| JP | 2018-159477 | 10/2018 |
| JP | 2019-034254 | 3/2019 |
| JP | 2019-175546 | 10/2019 |
| JP | 2020-049459 | 4/2020 |
| JP | 2020-49460 | 4/2020 |
| JP | 2020-64855 | 4/2020 |
| JP | 7017860 B2 * | 2/2022 |
| WO | WO 95/031012 A1 | 11/1995 |

OTHER PUBLICATIONS

JP6268130B2 (Machine translation, hereafter JP'130B2) (Year: 2017).*
International Search Report issued in International Patent Application No. PCT/JP2021/032511, dated Nov. 9, 2021, along with an English translation thereof.
Written Opinion of the International Searching Authority for International Patent Application No. PCT/JP2021/032511, dated Nov. 9, 2021, along with an English translation thereof.
Office Action issued in Japanese Counterpart Patent Appl. No. 2021-553828, dated Nov. 16, 2021, along with an English translation thereof.
Office Action issued in Japanese Counterpart Patent Appl. No. 2021-553828, dated Feb. 8, 2022, along with an English translation thereof.
Notice of Reasons for Refusal (Appeal) in Japanese Counterpart Patent Appl. No. 2021-553828 (Appeal No. 2022- 6478), dated Jul. 5, 2022, along with an English translation thereof.
Extended European Search Report in corresponding European patent application No. 21866682.4, dated mailed Mar. 28, 2024.
Zhou, et al., "The Current Process for the Recycling of Spent Lithium Ion Batteries," Frontiers in Chemistry, vol. 8, Dec. 3, 2020.
Office Action mailed on Sep. 9, 2025 issued with respect to related U.S. Appl. No. 18/025,485.
Office Action issued in Japan Counterpart Patent Appl. No. 2020-154515, dated Oct. 26, 2021.
Preliminary Report on Patentability issued in International Bureau of WIPO Patent Application No. PCT/JP2021/032875, dated Nov. 2, 2021.
International Search Report issued in International Bureau of WIPO Patent Application No. PCT/JP2021/032875, dated Nov. 2, 2021 with English translation.
Office Action issued in Taiwan Counterpart Patent Appl. No. 110133513, dated Jul. 21, 2022.
Office Action issued in Taiwan Counterpart Patent Appl. No. 110133513, dated Oct. 26, 2022.
Supplementary European Search Report issued in European Patent Application No. 21869250.7, dated Mar. 15, 2024.
Chinese Office Action issued in CN Application No. 202180062238.5 dated Apr. 18, 2024 with translation thereof.
Singapore Office Action issued in Singapore Patent Application No. 11202301809V, dated Jun. 30, 2025.
International Search Report Issued in international Patent Application No. PCT/JP2021/032876, dated Oct. 19, 2021, along with an English translation thereof.
Notice of Reasons for Revocation (Opposition) issued in Japanese Counterpart Patent Appl. No. 6965420, dated Jul. 27, 2022, (Opposition No. 2022-700376).
Extended European Search Report in corresponding European patent application No. 21869251.5, mailed on Feb. 12, 2024.
Office Action mailed Apr. 1, 2025 issued with respect to the corresponding Chinese patent application No. 202180062380.X.
Office Action in counterpart Singapore Application No. 11202301693P, dated Jul. 2, 2025.
Office Action in related U.S. Appl. No. 18/025,485, dated Dec. 29, 2025.
Office Action in related U.S. Appl. No. 18/025,490, dated Nov. 20, 2025.
Office Action in related U.S. Appl. No. 18/025,485, dated Apr. 3, 2026.
Nave, C. R. Magnetic Properties of Ferromagnetic Materials. HyperPhysics. 8 pages. https://hyperphysics.phy-astr.gsu.edu/hbase/hframe.html (Year: 2017).
Schwartz, Harold. Nickel. ProKon. (Year: 1998).
Australian Stainless Steel Development Association. Stainless Steel and Fire Resistance. Updated May 16, 2023. 7 pages. https://www.assda.asn.au/blog/307-stainless-steel-and-fire-resistance (Year: 2019).

* cited by examiner

VALUABLE MATTER RECOVERY METHOD

TECHNICAL FIELD

The present invention relates to a method for recovering a valuable substance.

BACKGROUND ART

Lithium ion secondary batteries have a lighter weight, a higher capacity, and a higher electromotive force than those of existing lead-acid batteries and NiCd secondary batteries, and are used as secondary batteries of, for example, personal computers, electric vehicles, and portable devices. For example, valuable substances such as cobalt and nickel are used in the positive electrodes of lithium ion secondary batteries in the form of, for example, lithium cobaltate ($LiCoO_2$) and a ternary system positive electrode material ($LiNi_xCo_yMn_zO_2$ (x+y+z=1)).

Lithium ion secondary batteries are expected to continue to become more widespread in use. Therefore, in terms of resource recycling, it is desirable to recover valuable substances such as lithium and copper from defective products generated in the production process or from lithium ion secondary batteries discarded due to, for example, expired life of the batteries and of the devices in which they are used. Here, processes for lithium ion secondary batteries for recovering valuable substances from them may include a thermal treatment for deactivating the lithium ion secondary batteries and rendering them harmless. In order to increase the value of valuable substances to be recovered, it is important to recover the valuable substances without inducing oxidization (embrittlement) of various metals to be contained in thermally treated products to be obtained by thermally treating the lithium ion secondary batteries.

A method for processing lithium ion batteries by heating, which is proposed as a method for thermally treating lithium ion secondary batteries while inhibiting embrittlement of various metals contained in the lithium ion secondary batteries is as follows. In order to heat lithium ion batteries in a combustion furnace for combusting combustion targets by flames while inhibiting the housings of the lithium ion batteries from being directly contacted by the flames, this method involves placing the lithium ion batteries in a battery protection container that inhibits the housings of the lithium ion batteries from being directly contacted by the flames in the combustion furnace, and bringing the flames into contact with the external surface of the battery protection container, to thereby process the lithium ion batteries by heating (for example, see PTL 1).

However, existing techniques of this type have a problem that the battery protection container may become, for example, deformed or broken.

CITATION LIST

Patent Literature

PTL 1: Japanese Patent Application Laid-Open (JP-A) No. 2016-207648

SUMMARY OF INVENTION

Technical Problem

As described above, according to the existing techniques that heat lithium ion secondary batteries by bringing flames into contact with the external surface of the battery protection container that protects the lithium ion secondary batteries, the battery protection container may deteriorate by the direct contact by the flames, and may be deformed or broken. Hence, the existing techniques may involve a lot of costs on production, replacement, and repair of the battery protection containers.

Moreover, according to the existing techniques described above, when the battery protection container has become deformed or broken by deterioration, there may be a case where excessive heat is applied to the lithium ion secondary batteries inside the battery protection container, valuable substances such as copper to be recovered from the lithium ion secondary batteries may be oxidized or embrittled, and the recovery rates and the grades of the valuable substances recovered may be low.

Furthermore, according to the above-described existing techniques that heat lithium ion secondary batteries by bringing flames into contact with the external surface of the battery protection container that protects the lithium ion secondary batteries, the temperatures of, particularly, the regions of the battery protection container that are contacted by the flames and their surroundings become high, but the temperatures of the regions opposite to the regions contacted by the flames do not become so high as the regions contacted by the flames, and it may be impossible to thermally treat the lithium ion secondary batteries uniformly due to different thermal treatment temperatures from location to location.

The present invention aims for solving the various problems in the related art and achieving an object described below. That is, an object of the present invention is to provide a method for recovering a valuable substance, the method being able to inhibit deterioration of a target storing unit in which a target containing a valuable substance is stored, and to thermally treat the target uniformly and recover the valuable substance at a high recovery rate at a high grade.

Solution to Problem

Means for solving the above problems are as follows.

<1> A method for recovering a valuable substance, the method including:

- a thermal treatment step of thermally treating a target containing a valuable substance while supporting a target storing unit, in which the target is stored, by a supporting unit that can support the target storing unit, wherein the thermally treating includes heating a gas present in a region, in which the supporting unit is positioned, by a flame for thermally treating the target such that the target storing unit is not contacted by the flame; and
- a valuable substance recovering step of recovering the valuable substance from a thermally treated product of the target obtained in the thermal treatment step.

<2> The method for recovering a valuable substance according to <1>,

- wherein in the thermal treatment step, a flame radiating unit provided on the supporting unit and configured to radiate the flame thermally treats the target.

<3> The method for recovering a valuable substance according to <2>,

- wherein in the thermal treatment step, the flame radiating unit thermally treats the target by radiating the flame in an approximately horizontal direction.

<4> The method for recovering a valuable substance according to <2> or <3>, wherein the flame radiating unit has a tubular member that is configured to radiate the flame and at least one end of which is open, and the flame radiating unit radiates the flame such that the flame does not go outside the tubular member.

<5> The method for recovering a valuable substance according to any one of <2> to <4>, wherein in the thermal treatment step, a plurality of flame radiating units, each of which is the flame radiating unit, thermally treat the target by heating the gas.

<6> The method for recovering a valuable substance according to any one of <1> to <5>, wherein the target storing unit is placeable on the supporting unit, and the thermally treating is performed while the target storing unit is placed on the supporting unit.

<7> The method for recovering a valuable substance according to any one of <1> to <6>, wherein the target storing unit is formed of iron or stainless steel.

<8> The method for recovering a valuable substance according to any one of <1> to <7>, wherein in the thermal treatment step, the target is thermally treated at 750° C. or higher and lower than 1,085° C.

<9> The method for recovering a valuable substance according to any one of <1> to <8>, wherein the target is a lithium ion secondary battery.

<10> The method for recovering a valuable substance according to <9>, wherein the lithium ion secondary battery has a housing containing aluminum, and in the thermal treatment step, the aluminum of the housing of the lithium ion secondary battery is melted and a melted product is separated.

<11> The method for recovering a valuable substance according to <9> or <10>, wherein the valuable substance contains copper.

<12> The method for recovering a valuable substance according to any one of <9> to <11>, wherein in the thermal treatment step, a combustion state of the lithium ion secondary battery is observed to judge whether combustion of the lithium ion secondary battery has finished or not, and when it is judged that combustion of the lithium ion secondary battery has finished, the thermally treating is terminated.

<13> The method for recovering a valuable substance according to any one of <1> to <12>, wherein the valuable substance recovering step includes:

a pulverizing step of pulverizing the thermally treated product, to obtain a pulverized product;

a classifying step of classifying the pulverized product at a classification point of 0.6 mm or greater and 2.4 mm or less, to obtain a coarse-grained product and a fine-grained product; and a magnetic force sorting step of sorting the coarse-grained product using a magnet having a magnetic flux density of 0.03 tesla or higher.

Advantageous Effects of Invention

According to the present invention, it is possible to solve the various problems in the related art and provide a method for recovering a valuable substance, the method being able to inhibit deterioration of a target storing unit in which a target containing a valuable substance is stored, and to thermally treat the target uniformly and recover the valuable substance at a high recovery rate at a high grade.

Figure 1A:
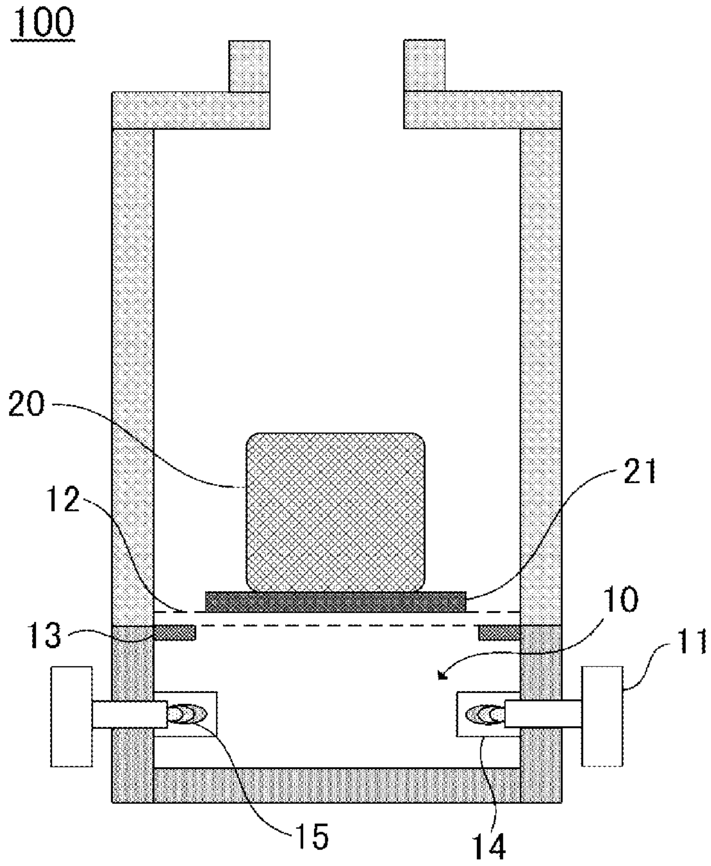
FIG. 1A is a concept diagram illustrating an example fixed bed furnace that can be used in a method for recovering a valuable substance of the present invention.

DESCRIPTION OF EMBODIMENTS (Method for Recovering a Valuable Substance)

A method for recovering a valuable substance of the present invention includes a thermal treatment step and a valuable substance recovering step, and further includes other steps as needed. The valuable substance recovering step of the method for recovering a valuable substance of the present invention preferably includes a pulverizing step, a classifying step, and a magnetic force sorting step, and further includes other steps as needed.

The method for recovering a valuable substance of the present invention is based on the present inventors' following finding. According to the existing techniques, when thermally treating targets such as lithium ion secondary batteries (LIB) to recover valuable substances such as copper, there may be a case where a target storing unit such as a container in which the targets are stored deteriorates, and there may also be a case where it is impossible to thermally treat the targets uniformly and the grades and the recovery rates of the valuable substances recovered are not sufficient.

More specifically, as described above, because the existing techniques thermally treat lithium ion secondary batteries by bringing flames into direct contact with the battery protection container that protects the lithium ion secondary batteries, the battery protection container may deteriorate, and may be deformed or broken. Hence, the existing techniques may involve a lot of costs on production, replacement, and repair of the battery protection containers. Moreover, when the battery protection container has deformed or broken by deterioration, valuable substances such as copper to be recovered from the lithium ion secondary batteries may be oxidized or embrittled, and the recovery rates and the grades of the valuable substances recovered may be low.

Furthermore, according to the above-described existing techniques that heat lithium ion secondary batteries by bringing flames into contact with the external surface of the battery protection container that protects the lithium ion secondary batteries, the temperatures of, particularly, the regions of the battery protection container that are contacted by the flames and their surroundings become high, but the temperatures of the regions opposite to the regions contacted by the flames do not become so high as the regions contacted by the flames, and it may be impossible to thermally treat the lithium ion secondary batteries uniformly (uneven burning may occur).

As described, the present inventors have found the existing techniques problematic in that the target storing unit in which targets containing valuable substances are stored may deteriorate, and in that the targets cannot be thermally treated uniformly and the grades and the recovery rates of valuable substances recovered may not be sufficient.

The present inventors have conceived the present invention through earnest studies into a method for recovering a valuable substance, the method being able to inhibit deterioration of a target storing unit in which a target containing a valuable substance is stored, and to thermally treat the target uniformly and recover the valuable substance at a high recovery rate at a high grade.

That is, the present inventors have found it possible to inhibit deterioration of a target storing unit in which a target containing a valuable substance is stored, and to thermally treat the target uniformly and recover the valuable substance at a high recovery rate at a high grade, by a method for recovering a valuable substance, the method including: a thermal treatment step of thermally treating a target containing a valuable substance while supporting a target storing unit, in which the target is stored, by a supporting unit that can support the target storing unit, wherein the thermally treating includes heating a gas present in a region, in which the supporting unit is positioned, by a flame for thermally treating the target such that the target storing unit is not contacted by the flame; and a valuable substance recovering step of recovering the valuable substance from a thermally treated product of the target obtained in the thermal treatment step.

According to the method for recovering a valuable substance of the present invention, while the target storing unit, in which a target containing a valuable substance is stored, is supported by a supporting unit that can support the target storing unit, a gas present in a region, in which the supporting unit is positioned, is heated by a flame for thermally treating the target such that the target storing unit is not contacted by the flame, to thereby thermally treat the target (thermal treatment step).

In this way, according to the present invention, while the target storing unit is supported by the supporting unit such that the target storing unit is not contacted by the flame for thermal treatment, a gas present in a region, in which the supporting unit is positioned, is heated by the flame, to thereby perform thermal treatment. In other words, according to the present invention, while it is ensured that the target storing unit is not to be contacted by the flame by the target storing unit being supported by the supporting unit, a gas present in a region, in which the supporting unit is positioned, is heated by the flame such that the target is thermally treated by the gas heated.

Hence, according to the present invention, because the target storing unit is not contacted by the flame for thermally treating the target, it is possible to avoid the target storing unit being heated excessively, and to inhibit deterioration of the target storing unit. Moreover, according to the present invention, because it is possible to inhibit deterioration of the target storing unit, it is possible to save maintenance costs for, for example, replacement and repair of the target storing unit.

Moreover, according to the method for recovering a valuable substance of the present invention, because it is possible to inhibit deterioration of the target storing unit since it is ensured that the target storing unit is not contacted by the flame for thermal treatment, it is possible to inhibit the valuable substance (for example, copper) contained in the target from being oxidized and embrittled due to, for example, the target storing unit being broken and the target being directly contacted by the flame for thermal treatment. Hence, it is possible to recover the valuable substance at a high recovery rate at a high grade in the valuable substance recovering step.

Furthermore, according to the method for recovering a valuable substance of the present invention, because the target is thermally treated by a gas present in a region, in which the supporting unit is positioned, being heated by the flame, not any portion of the target is contacted by the flame locally, and the target can be thermally treated uniformly by the gas heated. Hence, according to the method for recovering a valuable substance of the present invention, it is possible to thermally treat the target uniformly without uneven burning, to inhibit oxidization and embrittlement of the valuable substance (for example, copper) contained in the target, and to recover the valuable substance at a higher recovery rate at a higher grade in the valuable substance recovering step.

In this way, the method for recovering a valuable substance of the present invention including the thermal treatment step and the valuable substance recovering step specified above can inhibit deterioration of the target storing unit in which the target containing a valuable substance is stored, and can thermally treat the target uniformly and recover the valuable substance at a high recovery rate at a high grade.

In the following description, the details of, for example, the steps of the method for recovering a valuable substance of the present invention will be described.

<Thermal Treatment Step>

The thermal treatment step is a step of thermally treating a target containing a valuable substance while supporting a target storing unit, in which the target is stored, by a supporting unit that can support the target storing unit, wherein the thermally treating includes heating a gas present in a region, in which the supporting unit is positioned, by a flame for thermally treating the target such that the target storing unit is not contacted by the flame. In other words, the thermal treatment step is a step of supporting the target storing unit by the supporting unit to ensure that the target storing unit is not to be contacted by the flame, and heating a gas present in a region, in which the supporting unit is positioned, by the flame and thermally treating the target by the gas heated, to thereby obtain a thermally treated product. A thermally treated product represents a product obtained by thermally treating the target.

<<Target and valuable substance>>

The target is not particularly limited and may be appropriately selected in accordance with the intended purpose so long as the target contains a valuable substance and can be thermally treated in a continuous furnace while being stored in the target storing unit. Examples of the target include secondary batteries such as a lithium ion secondary battery and a nickel-hydrogen battery. Among these targets, a lithium ion secondary battery is preferable.

A valuable substance represents a substance that can suffice as a transaction object without being discarded. Examples of the valuable substance include various metals. When the target is a lithium ion secondary battery, examples of the valuable substance include a carbon (C) concentrate having a high-grade, copper (Cu), aluminum (Al), lithium (Li), cobalt (Co), and nickel (Ni). A carbon (C) concentrate having a high grade (e.g., a grade of 80% or higher) can be suitably used as, for example, a reductant in smelting of metals.

—Lithium Ion Secondary Battery—

The lithium ion secondary battery is not particularly limited and may be appropriately selected in accordance with the intended purpose. Examples of the lithium ion secondary battery include defective lithium ion secondary batteries generated in the production process of lithium ion secondary batteries, lithium ion secondary batteries discarded due to, for example, defects of the devices in which they are used and expired life of the devices in which they are used, and used lithium ion secondary batteries discarded due to expired life.

The shape, structure, size, and material of the lithium ion secondary battery are not particularly limited and may be appropriately selected in accordance with the intended purpose.

The shape of the lithium ion secondary battery is not particularly limited and may be appropriately selected in accordance with the intended purpose. Examples of the shape of the lithium ion secondary battery include a laminate shape, a cylindrical shape, a button shape, a coin shape, a square shape, and a flat shape.

The form of the lithium ion secondary battery is not particularly limited and may be appropriately selected in accordance with the intended purpose. Examples of the form of the lithium ion secondary battery include a battery cell, a battery module, and a battery pack. A battery module represents a product including a plurality of battery cells, which are unit cells, in one housing in a connected state. A battery pack represents a product including a plurality of battery modules in one housing. A battery pack may be equipped with, for example, a controller or a cooling device.

Examples of the lithium ion secondary battery include a lithium ion secondary battery including a positive electrode, a negative electrode, a separator, an electrolytic solution containing an electrolyte and an organic solvent, and an exterior container, which is a battery case in which the positive electrode, the negative electrode, the separator, and the electrolytic solution are stored. A lithium ion secondary battery from which, for example, a positive electrode or a negative electrode is lost, may also be used.

——Positive Electrode——

The positive electrode is not particularly limited and may be appropriately selected in accordance with the intended purpose. It is preferable that the positive electrode includes a positive electrode current collector and contains a positive electrode material containing either or both of cobalt and nickel. The shape of the positive electrode is not particularly limited and may be appropriately selected in accordance with the intended purpose. Examples of the shape of the positive electrode include a flat plate shape and a sheet shape.

———Positive Electrode Current Collector———

For example, the shape, structure, size, and material of the positive electrode current collector are not particularly limited and may be appropriately selected in accordance with the intended purpose.

Examples of the shape of the positive electrode current collector include a foil shape.

Examples of the material of the positive electrode current collector include stainless steel, nickel, aluminum, copper, titanium, and tantalum. Among these materials, aluminum is preferable.

The positive electrode material is not particularly limited and may be appropriately selected in accordance with the intended purpose. Examples of the positive electrode material include a positive electrode material that contains at least a positive electrode active substance containing lithium, and that contains a conducting agent and a binder resin as needed.

The positive electrode active substance is not particularly limited and may be appropriately selected in accordance with the intended purpose. A positive electrode active substance containing either or both of cobalt and nickel is preferable.

Examples of the positive electrode active substance include lithium manganate ($LiMn_2O_4$) referred to as an LMO system, lithium cobaltate ($LiCoO_2$) referred to as an LCO system, $LiNi_xCo_yMn_zO_2$ (x+y+z=1) referred to as a ternary system and an NCM system, $LiNi_xCo_yAl_z$ (x+y+z=1) referred to as an NCA system, lithium iron phosphate ($LiFePO_4$), lithium cobalt-nickelate ($LiCo_{1/2}Ni_{1/2}O_2$), and lithium titanate ($Li_2TiO_3$). As the positive electrode active substance, these materials may be used in combination.

The conducting agent is not particularly limited and may be appropriately selected in accordance with the intended purpose. Examples of the conducting agent include carbon black, graphite, carbon fiber, and metal carbides.

The binder resin is not particularly limited and may be appropriately selected in accordance with the intended purpose. Examples of the binder resin include homopolymers or copolymers of, for example, vinylidene fluoride, tetrafluoroethylene, acrylonitrile, and ethylene oxide, and styrene-butadiene rubbers.

——Negative Electrode——

The negative electrode is not particularly limited and may be appropriately selected in accordance with the intended purpose. It is preferable that the negative electrode includes a negative electrode current collector and contains a negative electrode active substance containing carbon (C).

The shape of the negative electrode is not particularly limited and may be appropriately selected in accordance with the intended purpose. Examples of the shape of the negative electrode include a flat plate shape and a sheet shape.

———Negative Electrode Current Collector———

For example, the shape, structure, size, and material of the negative electrode current collector are not particularly limited and may be appropriately selected in accordance with the intended purpose.

Examples of the shape of the negative electrode current collector include a foil shape.

Examples of the material of the negative electrode current collector include stainless steel, nickel, aluminum, copper, titanium, and tantalum. Among these materials, copper is preferable.

The negative electrode active substance is not particularly limited and may be appropriately selected in accordance with the intended purpose so long as the negative electrode active substance contains carbon (C). Examples of the negative electrode active substance include carbon materials such as graphite and hard carbon, titanate, and silicon. As the negative electrode active substance, these materials may be used in combination.

The material of the exterior container (housing) of the lithium ion secondary battery is not particularly limited and may be appropriately selected in accordance with the intended purpose. Examples of the material of the exterior container include aluminum, iron, stainless steel, and resins (plastics).

According to the present invention, for example, when a lithium ion secondary battery containing a large quantity of aluminum, such as a lithium ion secondary battery having a housing formed of aluminum, is the target, it is possible to melt aluminum, which is an example of the valuable substance, and separate aluminum as a melted product in the thermal treatment step. In other words, in the method for recovering a valuable substance of the present invention, it is preferable that the lithium ion secondary battery has a housing containing aluminum, and that aluminum of the housing of the lithium ion secondary battery be melted and a melted product be separated in the thermal treatment step.

<<Target Storing Unit>>

The target storing unit is not particularly limited and may be appropriately selected in accordance with the intended purpose so long as the target can be stored in the target storing unit. Examples of the target storing unit include a container, a drum, and the exterior container of a lithium ion secondary battery pack or module.

For example, a preferable material of the target storing unit has a melting point higher than the temperature (thermal treatment temperature) in the thermal treatment. More specifically, for example, iron and stainless steel are preferable as the material of the target storing unit. In other words, in the method for recovering a valuable substance of the present invention, it is preferable that the target storing unit be formed of iron or stainless steel. Such a target storing unit can be better inhibited from, for example, deterioration, deformation, and breakage in the thermal treatment.

The size of the target storing unit is not particularly limited and may be appropriately selected in accordance with the intended purpose so long as the target can be stored in the target storing unit. For example, the size of the target storing unit may be a size that can be placed in a heating section (an inside space of a furnace) of a thermal treatment furnace (roasting furnace) configured to perform thermal treatment. The shape and structure of the target storing unit are not particularly limited and may be appropriately selected in accordance with the intended purpose so long as the target can be stored in the target storing unit.

It is preferable that the target storing unit has an opening through which a gas is circulatable. In this case, it is preferable that a lithium ion secondary battery be stored in the target storing unit such that a gas does not circulate through any place other than the opening. With an opening in the storing container, it is possible to control the pressure and the atmosphere inside the storing container.

The shape of the opening is not particularly limited and may be appropriately selected in accordance with the intended purpose. The position of the opening on the target storing unit is not particularly limited and may be appropriately selected in accordance with the intended purpose so long as a gas is circulatable through the position during thermal treatment. A plurality of openings may be formed in the target storing unit.

A hole formed in the exterior container of a lithium ion secondary battery pack or module may be used as the opening. A lithium ion secondary battery pack typically has a hole through which a cable or a plug for charging or discharging is connected to a portion inside the pack or module in which electricity flows. This hole may be used as the opening.

The size (area) of the opening is not particularly limited, may be appropriately selected in accordance with the intended purpose, and is preferably less than or equal to 12.5% and more preferably less than or equal to 6.3% of the surface area of the target storing unit. When the size of the opening is less than or equal to 12.5% of the surface area of the target storing unit, it is possible to inhibit oxidization of valuable substances contained in the current collectors during thermal treatment. In the following description, the area of the opening relative to the surface area of the target storing unit may be referred to as an "opening percentage". When the target storing unit has a plurality of openings, the opening percentage may be the total of the areas of the openings relative to the surface area of the target storing unit.

When the opening percentage of the target storing unit is in the preferable range specified above, the atmosphere inside the target storing unit during thermal treatment can become a hypoxic atmosphere, provided that the atmosphere outside the target storing unit is, for example, the atmospheric atmosphere.

As the target storing unit, one that has an openable and closable lid for letting in a lithium ion secondary battery is preferable. This facilitates storing of the lithium ion secondary battery inside the target storing unit, and removal of the thermally treated lithium ion secondary battery (thermally treated product) after the thermal treatment step.

The lid is not particularly limited and may be appropriately selected in accordance with the intended purpose.

The lid may be secured in an openable and closable manner by, for example, a hinge. Alternatively, the lid may be attached or detached for opening and closing.

<<Supporting Unit>>

The supporting unit used in the thermal treatment step is not particularly limited and may be appropriately selected in accordance with the intended purpose so long as the supporting member can support the target storing unit and a heated gas can contact the target storing unit.

The supporting unit used in the thermal treatment step may be able to support a plurality of target storing units.

The method by which the supporting unit supports the target storing unit is not particularly limited and may be appropriately selected in accordance with the intended purpose so long as the supporting unit can support the target storing unit such that the target storing unit is not contacted by a flame for thermally treating the target.

Examples of the method by which the supporting unit supports the target storing unit include a method of supporting the target storing unit by placement of the target storing unit on the supporting unit (i.e., supporting the bottom surface of the target storing unit), a method of supporting the target storing unit by interposition of the target storing unit between, for example, arms (i.e., supporting the side surfaces of the target storing unit), a method of supporting the target storing unit by suspension, and a method of supporting the target storing unit by leaning of the target storing unit against the supporting unit. Among these methods, the method of supporting the target storing unit by placement of the target storing unit on the supporting unit is preferable as the method by which the supporting unit supports the target storing unit. In other words, in the present invention, it is preferable that the target storing unit be placeable on the supporting unit and that the thermal treatment be performed while the target storing unit is placed on the supporting unit.

In this way, in the present invention, a gas heated by a flame ascends upward below the target storing unit, and mixes into the roasting furnace used for the thermal treatment. Therefore, it is possible to thermally treat the target more uniformly and to recover a valuable substance at a higher recovery rate at a higher grade.

As the method for heating a gas present in a region, in which the supporting unit is positioned, by a flame, for example, a flame radiating unit provided on the supporting unit and configured to radiate a flame can be used. In other words, in the present invention, it is preferable to thermally treat the target in the thermal treatment step by a flame radiating unit provided on the supporting unit and configured to radiate a flame.

The flame radiating unit configured to radiate a flame for thermal treatment is not particularly limited and may be appropriately selected in accordance with the intended purpose. Examples of the flame radiating unit include a burner.

The direction in which the flame radiating unit provided on the supporting unit radiates a flame is not particularly limited and may be appropriately selected in accordance with the intended purpose so long as the direction is a direction in which the target storing unit is not contacted by the flame.

For example, when performing thermal treatment while placing the target storing unit on the supporting unit as described above, it is preferable that the flame radiating unit radiates a flame in an approximately horizontal direction. In other words, in the present invention, it is preferable to thermally treat the target in the thermal treatment step by radiating a flame in an approximately horizontal direction using the flame radiating unit.

This makes it possible to securely avoid the target storing unit placed on the supporting unit being contacted by the flame and to better inhibit deterioration of the target storing unit.

The number of flame radiating units provided on the supporting unit is not particularly limited, may be appropriately selected in accordance with the intended purpose, and may be one or a plural number. A plural number is preferable. In other words, in the present invention, it is preferable to thermally treat the target in the thermal treatment step by heating a gas using a plurality of flame radiating units.

This makes it possible to minimize the flame length (output) per one flame radiating unit, to avoid overheating the gas locally, and to better inhibit the target from being unevenly burned depending on the positions at which the flame radiating units are installed (or the directions in which the flames are radiated). Therefore, it is possible to better improve the grade of the valuable substance to be recovered.

When a plurality of flame radiating units are provided, it is preferable to dispose the flame radiating units at positions symmetrical with respect to the target storing unit. This makes it possible to heat the gas present in the region, in which the supporting unit is positioned, more uniformly, and to thermally treat the target more uniformly.

As the material of the supporting unit, a material having a melting point higher than the temperature (thermal treatment temperature) during thermal treatment is preferable. More specific examples of the material of the flame blocking unit include iron, stainless steel, and brick.

The size of the supporting unit is not particularly limited and may be appropriately selected in accordance with the intended purpose so long as the supporting unit can support the target storing unit. It is preferable to select the size of the supporting unit in accordance with, for example, the specifications of the combustion furnace used for thermal treatment, the direction in which or the position at which the flame is radiated, and the size of the target storing unit.

The shape and structure of the supporting unit are not particularly limited and may be appropriately selected in accordance with the intended purpose so long as the supporting unit can support the target storing unit and a heated gas can contact the target storing unit. For example, as the supporting unit, one that includes: a supporting section for supporting the target storing unit; and a gas heating section that is equipped with the flame radiating unit and in which a gas can be positioned can be used.

As the supporting section for supporting the target storing unit, for example, one through which a gas can easily circulate is preferable. A supporting section having a lattice shape can be suitably used.

In the thermal treatment step, for example, a publicly-known roasting furnace (combustion furnace) can be used. The roasting furnace (combustion furnace) is not particularly limited and may be appropriately selected in accordance with the intended purpose so long as the roasting furnace can thermally treat (heat) the target by a flame. As such a roasting furnace, for example, a fixed bed furnace can be suitably used.

In the present invention, it is preferable to thermally treat the target by heating a gas present in a region, in which the supporting unit specified above is positioned, by a flame for thermally treating the target such that the target storing unit is not contacted by the flame, using a fixed bed furnace including the supporting unit specified above.

The gas to be heated in the thermal treatment step is not particularly limited, may be appropriately selected in accordance with the intended purpose, and may be selected in accordance with, for example, the atmosphere used for thermal treatment.

Examples of the atmosphere used for thermal treatment include an atmospheric atmosphere, an oxidizing atmosphere, an inert atmosphere, a reducing atmosphere, and a hypoxic atmosphere.

The atmospheric atmosphere (air atmosphere) represents an atmosphere using open air (air) in which oxygen accounts for 21% by volume and nitrogen accounts for 78% by volume.

The oxidizing atmosphere represents an atmosphere in which an inert atmosphere such as nitrogen or argon contains oxygen by 1% by mass or greater and 21% by mass or less. An atmosphere containing oxygen by 1% by mass or greater and 5% by mass or less is preferable.

The inert atmosphere represents an atmosphere formed of nitrogen or argon.

The reducing atmosphere represents an atmosphere in which an inert atmosphere such as nitrogen or argon contains, for example, CO, $H_2$, $H_2S$, and $SO_2$.

The hypoxic atmosphere represents an atmosphere in which an oxygen partial pressure is 5% or lower.

Hence, gases that form various atmospheres can be used in the present invention. For example, it is preferable to use air.

FIG. 1A is a concept diagram illustrating an example fixed bed furnace that can be used in the method for recovering a valuable substance of the present invention.

As illustrated in FIG. 1A, a fixed bed furnace 100 includes a gas heating section 10, burners 11, a supporting section 12, projections 13, and cylindrical flame radiating outlets 14. In the example illustrated in FIG. 1A, when the burners 11 provided on the left and right-hand sides in the gas heating section 10 radiate flames 15, the gas positioned inside the gas heating section 10 can be heated. In the example illustrated in FIG. 1A, the burners 11 radiate the flames 15 in an approximately horizontal direction inside the cylindrical flame radiating outlets 14. In the example illustrated in FIG. 1A, the supporting section 12 is supported by being placed on the projections 13 provided on the gas heating section 10. FIG. 1A is a concept diagram illustrating the fixed bed furnace 100 in a horizontal perspective in order to make it easier to understand what the burners 11 are like in the fixed bed furnace 100.

In the present invention, as illustrated in FIG. 1A, for example, the supporting section (receiving seat) 12 is provided above the gas heating section 10, and a target storing unit 20 in which a target is stored, and a receptacle 21 into which to recover melted aluminum are disposed on the supporting section 12. As can be understood, in the example illustrated in FIG. 1A, the target storing unit 20 is placed on the supporting section 12.

In the present invention, for example, as illustrated in FIG. 1A, while the target storing unit 20 is placed on the supporting section 12 to ensure that the target storing unit 20 is not to be contacted by the flames 15 for thermally treating the target, the gas present in the gas heating section 10 is heated by the flames 15 radiated from the burners 11, to thereby thermally treat the target stored in the target storing unit 20. Hence, according to the present invention, for example, it is possible to avoid overheating the target storing unit 20 and to inhibit deterioration of the target storing unit 20. Moreover, it is possible to thermally treat the target uniformly without uneven burning, because the target is thermally treated by the heated gas.

Figure 1B:
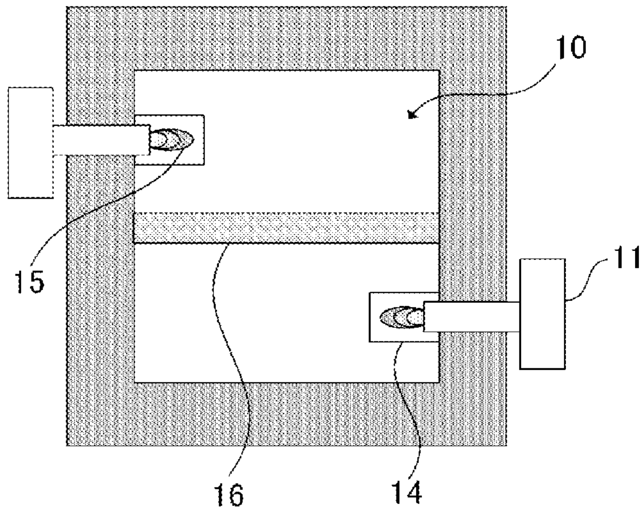
FIG. 1B is a concept diagram illustrating an example top view of a gas heating section of the fixed bed furnace illustrated in FIG. 1A.

FIG. 1B is a concept diagram illustrating an example top view of the gas heating section of the fixed bed furnace illustrated in FIG. 1A.

As illustrated in FIG. 1B, when the gas heating section 10 of the fixed bed furnace 100 is seen from above by assuming a horizontal cross-section between the projections 13 (unillustrated) and the burners 11, one burner 11 is disposed on the upper left side of FIG. 1B, and another burner 11 is disposed on the lower right side of FIG. 1B. In the example illustrated in FIG. 1B, a partition 16 is provided between the burner 11 disposed on the upper left side and the burner 11 disposed on the lower right side.

Figures 1C, 1D:
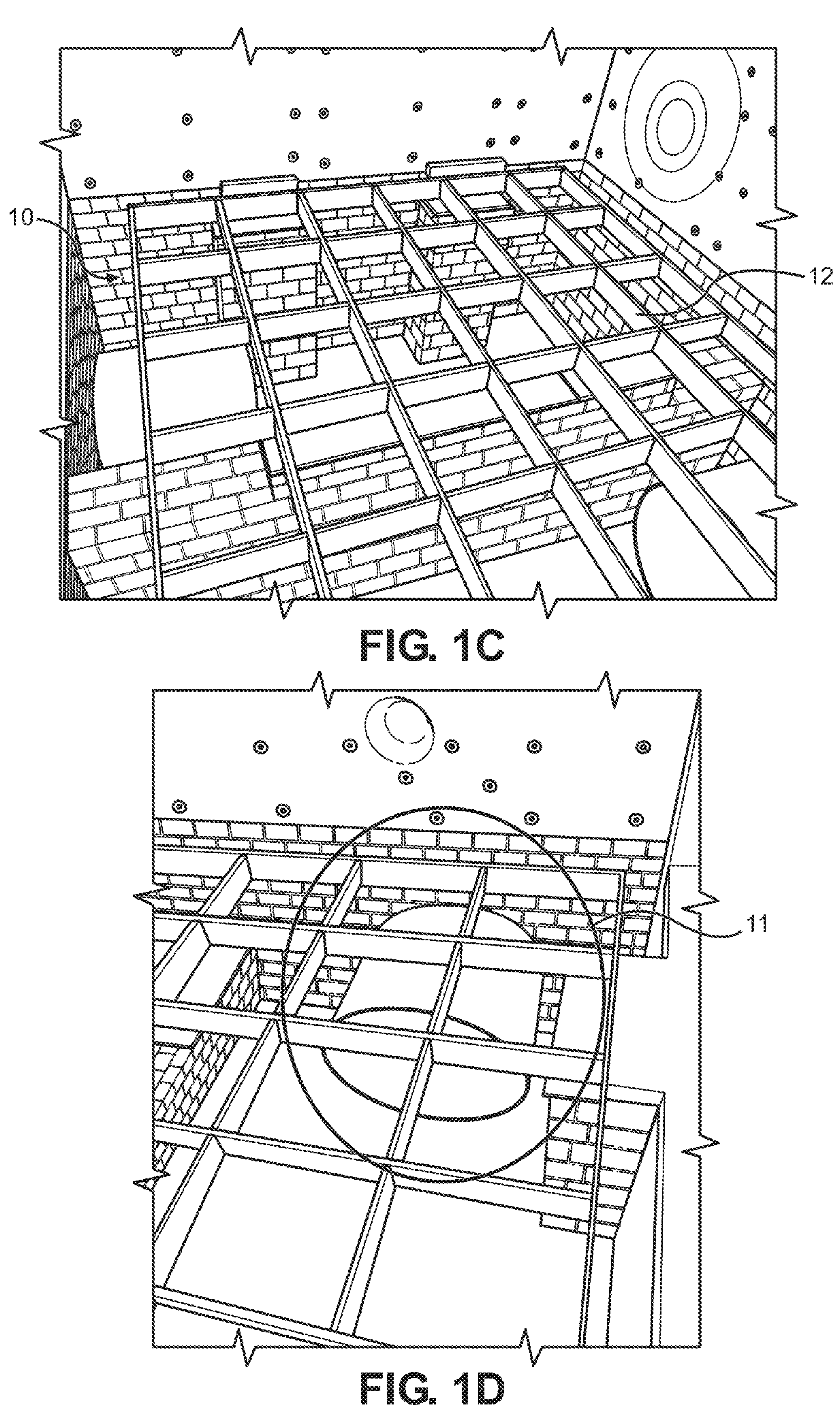
FIG. 1C is a captured image of an example supporting section (receiving seat) and an example gas heating section of a fixed bed furnace as illustrated in FIG. 1A and FIG. 1B.
FIG. 1D is a captured image of an example supporting section (receiving seat), an example gas heating section, and an example burner of a fixed bed furnace as illustrated in FIG. 1A and FIG. 1B.

FIG. 1C is a captured image of an example supporting section (receiving seat) and an example gas heating section of a fixed bed furnace as illustrated in FIG. 1A and FIG. 1B.

In the example in the captured image illustrated in FIG. 10, what are reflected are a lattice-shaped supporting section (receiving seat) 12, and a gas heating section 10 below the supporting section (receiving seat) 12.

FIG. 1D is a captured image of an example supporting section (receiving seat), an example gas heating section, and an example burner of a fixed bed furnace as illustrated in FIG. 1A and FIG. 1B.

In FIG. 1D, the burner 11 has a cylindrical flame radiating outlet. When the burner 11 radiates a flame, it is preferable that the length of the flame (flame length) be shorter than the cylindrical flame radiating outlet.

That is, in the present invention, it is preferable that the flame radiating unit has a tubular member that is configured to radiate a flame and at least one end of which is open, and that the flame radiating unit radiates the flame such that the flame does not go outside the tubular member. This makes it possible to accurately control the direction in which the flame is radiated, to securely avoid the target storing unit being contacted by the flame, and to place the supporting section on the cylindrical member.

In the present invention, when the target is a lithium ion secondary battery, it is preferable to observe the combustion state of the lithium ion secondary battery in the thermal treatment step to judge whether combustion of the lithium ion secondary battery has finished or not, and to terminate the thermal treatment when it is judged that combustion of the lithium ion secondary battery has finished. This makes it possible to thermally treat the lithium ion secondary battery without overdoing or underdoing, to better inhibit deterioration of the target storing unit, and to perform the thermal treatment more efficiently in a short time.

The method for observing the combustion state of the lithium ion secondary battery is not particularly limited and may be appropriately selected in accordance with the intended purpose. Examples of the method include visual observation, an analysis of an image captured by a camera, an analysis of temperature information obtained by thermography, a thermocouple, or a radiation thermometer, and an analysis of changes in the concentrations of gases (e.g., CO, $CO_2$, and $O_2$). These methods may be used in combination.

More specifically, it is possible to judge whether combustion of a lithium ion secondary battery has finished or not, by, for example, confirming extinction of ignition from the target storing unit based on an image captured by a camera installed inside the furnace, or opening the entrance of the furnace only to a degree that the gas inside the furnace does not leak outside the system and confirming extinction of ignition from the target storing unit by visual observation from outside the furnace.

When terminating the thermal treatment when it is judged that combustion of the lithium ion secondary battery has finished, it is optional whether to completely stop the flame or to radiate a flame necessary to retain the temperature inside the roasting furnace.

<<Thermal Treatment Conditions>>

The conditions (thermal treatment conditions) for thermally treating (heating) the target are not particularly limited and may be appropriately selected in accordance with the intended purpose, so long as the conditions enable the respective constituent components of the target to be brought into a state from which a valuable substance can be recovered in the valuable substance recovering step described below.

Examples of the thermal treatment conditions include thermal treatment temperature and thermal treatment time.

The thermal treatment temperature represents a temperature of the target (for example, a lithium ion secondary battery) during the thermal treatment. It is possible to measure the thermal treatment temperature by inserting a thermometer such as a thermocouple or a thermistor into the target at the thermal treatment temperature.

The thermal treatment temperature can be appropriately selected in accordance with the target.

When the target is a lithium ion secondary battery, it is preferable that the thermal treatment temperature be higher than or equal to the melting point of the housing (exterior container) of the lithium ion secondary battery. At such a temperature, when the housing of the lithium ion secondary battery is formed of a metal, the housing can be melted in the thermal treatment step, and, for example, it is easy to recover the metal derived from the housing and, for example, the electrodes of the lithium ion secondary battery separately from each other by disposing a receptacle into which to recover the melted metal of the housing below the lithium ion secondary battery.

More specifically, for example, when the housing of a lithium ion secondary battery contains aluminum, it is preferable that the thermal treatment temperature be higher than or equal to 660° C., which is the melting point of aluminum. This makes it possible to melt and recover aluminum contained in the housing of the lithium ion secondary battery in the thermal treatment step. That is, when a lithium ion secondary battery including a housing containing aluminum is the target, the method for recovering a valuable substance of the present invention can easily recover aluminum derived from the housing by easily sorting (separating) aluminum contained in the housing and other parts (for example, electrodes) of the lithium ion secondary battery from each other by thermally treating the lithium ion secondary battery at higher than or equal to 660° C. in the thermal treatment step.

For recovering aluminum of the housing of the lithium ion secondary battery, for example, a receptacle for aluminum may be disposed below the target storing unit in the thermal treatment step and aluminum may be recovered.

In the method for recovering a valuable metal of the present invention, when the target is a lithium ion secondary battery, the thermal treatment temperature is preferably 750° C. or higher, more preferably 750° C. or higher and 1,080° C. or lower, and particularly preferably 750° C. or higher and 900° C. or lower. When the thermal treatment temperature is 750° C. or higher, lithium in $Li(Ni/Co/Mn)O_2$ contained in the positive electrode active substance of the lithium ion secondary battery or lithium in $LiPF_6$ contained in the electrolyte of the lithium ion secondary battery can be changed to aqueous solution-soluble substances, such as lithium fluoride (LiF), lithium carbonate ($Li_2CO_3$), and lithium oxide ($Li_2O$), so it is possible to separate lithium from impurities other than fluorine by leaching. Moreover, when the thermal treatment temperature is 750° C. or higher, cobalt oxide and nickel oxide contained in the positive electrode active substance are reduced to metals, and it is possible to grow these metals to a particle diameter with which it is easy to magnetically attract the metals in a magnetic sorting step described below. This increase in the particle diameter of the metals is more apparent as the thermal treatment is performed at a higher temperature.

Moreover, for example, when a lithium ion secondary battery including a housing containing aluminum is the target and the thermal treatment temperature is higher than or equal to 750° C. (which is a temperature higher than 660° C., which is the melting point of aluminum) and lower than 1,085° C. (which is the melting point of copper), it is possible to separate and recover aluminum derived from the housing, and to better inhibit oxidization or embrittlement of copper contained in the negative electrode current collector and better improve the recovery rate and the grade of copper.

The thermal treatment time (a time for which the target is thermally treated) is not particularly limited, may be appropriately selected in accordance with the intended purpose, and is preferably, for example, 1 minute or longer and 5 hours or shorter, more preferably 1 minute or longer and 2 hours or shorter, and particularly preferably 1 minute or longer and 1 hour or shorter. The thermal treatment time may be, for example, a time taken until the target reaches the thermal treatment temperature specified above, and the retention time may be short. When the thermal treatment time is 1 minute or longer and hours or shorter, there are advantages that the costs taken for thermal treatment can be saved, and the thermal treatment efficiency can be improved.

The atmosphere used in the thermal treatment (the atmosphere surrounding the target) is not particularly limited and may be appropriately selected in accordance with the intended purpose. Examples of the atmosphere include an atmospheric atmosphere, an inert atmosphere, a reducing atmosphere, and a hypoxic atmosphere.

The atmospheric atmosphere represents an atmosphere using air.

Examples of the inert atmosphere include an atmosphere formed of nitrogen or argon.

The reducing atmosphere represents an atmosphere in which an inert atmosphere such as nitrogen or argon contains, for example, CO, $H_2$, $H_2S$, and $SO_2$.

The hypoxic atmosphere represents an atmosphere in which an oxygen partial pressure is 11% or lower.

Among these atmospheres, the hypoxic atmosphere is preferable because the hypoxic atmosphere can minimize oxidization of the target storing unit and of valuable substances such as copper by oxygen.

<Valuable Substance Recovering Step>

The valuable substance recovering step is a step of recovering a valuable substance from a thermally treated product of the target obtained in the thermal treatment step.

The valuable substance recovering step is not particularly limited and may be appropriately selected in accordance with the intended purpose so long as a valuable substance can be recovered from the thermally treated product. As described above, it is preferable that the valuable substance recovering step includes a pulverizing step, a classifying step, and a magnetic force sorting step.

<<Pulverizing Step>>

The pulverizing step is a step of pulverizing a thermally treated product to obtain a pulverized product.

The pulverizing step is not particularly limited and may be appropriately selected in accordance with the intended purpose so long as the pulverizing step is a step of pulverizing a thermally treated product (roasted product) to obtain a pulverized product. The pulverized product represents a product obtained by pulverizing a thermally treated product.

The pulverizing step is preferably a step of pulverizing a thermally treated product by, for example, an impact, to obtain a pulverized product. For example, when a lithium ion secondary battery is selected as the target, it is more preferable to perform a preparatory pulverization, in which a thermally treated product is cut with a cutting device, before applying an impact to the thermally treated product, when there is a condition of not melting the housing of the lithium ion secondary battery in the thermal treatment step.

Examples of the pulverization method by an impact include a method of throwing the thermally treated product using a rotating beating board and slamming the thermally treated product against an impact board to apply an impact, and a method of beating the thermally treated product using a rotating beater. The method can be performed with, for example, a hammer crusher. The pulverization method by an impact may be a method of beating the thermally treated product using a ball formed of, for example, ceramic. This method can be performed with a ball mill. Pulverization by an impact can also be performed with, for example, a biaxial crusher configured to perform pulverization by compression and having a short width of cut and a short blade length.

Examples of the pulverization method by an impact also include a method of beating the thermally treated product with two rotating chains to apply an impact. This method can be performed with a chain mill.

By pulverization of a thermally treated product of a lithium ion secondary battery by an impact, the positive electrode current collector (for example, aluminum (Al)) is pulverized, whereas the negative electrode current collector (for example, copper (Cu)) that does not significantly change in form exists in the form of, for example, a foil. Therefore, in the pulverizing step, the negative electrode current collector does not go beyond being cut. Hence, it is possible to obtain a pulverized product in which valuable substances derived from the positive electrode current collector (for example, aluminum) and valuable substances derived from the negative electrode current collector (for example, copper (Cu)) can be efficiently separated from each other in a classifying step described below.

The pulverization time in the pulverizing step is not particularly limited and may be appropriately selected in accordance with the intended purpose. For example, when the target is a lithium ion secondary battery, the pulverization time per 1 kg of a lithium ion secondary battery is preferably 1 second or longer and 30 minutes or shorter, more preferably 2 seconds or longer and 10 minutes or shorter, and particularly preferably 3 seconds or longer and 5 minutes or shorter.

The pulverization conditions in the pulverizing step are as follows. For example, for pulverization using an impact-type or beating-type pulverizer such as a chain mill or a hammer mill, it is preferable to set the tip speed of the chain or the hammer to 10 m/sec or higher and 300 m/sec or lower, and to set the residence time of the target in the pulverizer to 1 second or longer and 10 minutes or shorter. In the method for recovering a valuable substance of the present invention, these conditions make it possible to pulverize copper and aluminum, which are positive electrode materials, and members derived from the housing and formed of, for example, Fe, without excessively minutely pulverizing them.

<<Classifying Step>>

The classifying step is a step of classifying a pulverized product at a classification point of 0.6 mm or greater and 2.4 mm or less to obtain a coarse-grained product and a fine-grained product.

The classifying step is not particularly limited and may be appropriately selected in accordance with the intended purpose so long as the classifying step is a step through which it is possible to obtain a coarse-grained product and a fine-grained product by classifying a pulverized product at a classification point of 0.6 mm or greater and 2.4 mm or less. When the target is a lithium ion secondary battery, it is possible to separate, for example, copper (Cu), iron (Fe), and aluminum (Al) into a coarse-grained product and separate, for example, lithium (Li), cobalt (Co), nickel (Ni), manganese (Mn), and carbon (C) into a fine-grained product through the classifying step.

The classifying step can be performed using, for example, a vibrating sieve, a multi-stage vibrating sieve, a cyclone, and a JIS 28801 standard sieve.

The particle size (classification point or mesh size of a sieve) for classification is preferably 0.6 mm or greater and 2.4 mm or less, more preferably 0.85 mm or greater and 1.7 mm or less, and particularly preferably approximately 1.2 mm.

When the particle size for classification is 2.4 mm or less, it is possible to inhibit inclusion of, for example, copper (Cu), iron (Fe), and aluminum (Al) into the fine-grained product. When the particle size for classification is 0.6 mm or greater, it is possible to inhibit inclusion of, for example, carbon (C), lithium (Li), cobalt (Co), nickel (Ni), and manganese (Mn) into the coarse-grained product.

Sieving (classification) into an oversize product (coarse-grained product) and an undersize product (fine-grained product) may be repeated a plurality of times. This re-sieving can even more reduce the impurity grade in each product.

The pulverizing step and the classifying step may be performed simultaneously. For example, the pulverizing step and the classifying step may be performed as a pulverizing/classifying step (pulverization and classification) of pulverizing a thermally treated product obtained in the thermal treatment step while classifying an obtained pulverized product into a coarse-grained product and a fine-grained product.

<<Magnetic Force Sorting Step>>

The magnetic force sorting step is a step of sorting a coarse-grained product using a magnet having a magnetic flux density of 0.03 tesla or higher. In other words, in the magnetic force sorting step, a pulverized product is subjected to sorting by a magnetic force, to thereby recover a valuable substance from the target (or from a pulverized product obtained by thermally treating and pulverizing the target). In the following description, sorting by a magnetic force may be referred to as "magnetic force sorting" or "magnetic sorting".

The magnetic force sorting step can be performed using, for example, a publicly-known magnetic force sorter (magnetic sorter).

The magnetic force sorter that can be used in the present invention is not particularly limited and may be appropriately selected in accordance with the intended purpose. Examples of the magnetic force sorter include a bar magnet, a lattice magnet, a rotary magnet, a magnet strainer, a high magnetic force pulley (magnet pulley) magnetic sorter, a drum-shaped magnetic sorter, and a suspended magnetic sorter. Among these magnetic force sorters, it is preferable to use a drum-shaped magnetic sorter and a suspended magnetic sorter in the present invention.

In the magnetic force sorting step, for example, sorting is performed with a magnetic force that can sort a magnetically attractable material and a non-magnetically attractable material contained in the target from each other depending on the kind of the target (or the kinds of valuable substances contained in the target).

A magnetically attractable material represents a material that can be attracted to a magnetic force source by an attractive force generated between the material and the magnetic force source by a magnetic force generated by the magnetic force source configured to generate a magnetic force (a magnetic field) (for example, a magnet and an electromagnet). Examples of the magnetically attractable material include ferromagnetic metals. Examples of ferromagnetic metals include iron, nickel, and cobalt.

A non-magnetically attractable material represents a material that is not attracted to the magnetic force source by a magnetic force generated by the magnetic force source. The non-magnetically attractable material is not particularly limited and may be appropriately selected in accordance with the intended purpose. Examples of non-magnetically attractable metal materials include paramagnetic or diamagnetic metals. Examples of paramagnetic or diamagnetic metals include aluminum, manganese, gold, silver, and copper.

For example, when a lithium ion secondary battery is selected as the target, magnetically attractable materials such as iron contained in the pulverized product and non-magnetically attractable materials containing, for example, copper, which is a valuable substance, contained in the pulverized product can be separated from each other in the magnetic force sorting step.

In the above example in which a lithium ion secondary battery is the target, a case where the valuable substance to be sorted is contained in the non-magnetically attractable materials is described. The present invention is not limited to this example. For example, depending on the kind of the target, the valuable substance to be sorted may be contained in the magnetically attractable materials.

The magnetic force in the magnetic force sorting step is not particularly limited and may be appropriately selected in accordance with the intended purpose so long as the magnetic force is 0.03 T (tesla) or higher. For example, when sorting iron, the magnetic force is preferably 0.01 T (tesla) or higher and 0.3 T or lower. When sorting stainless steel, a magnetic force higher than the range specified above may be used. Different magnetic forces may be combined and used in multiple stages.

In this way, the method for recovering a valuable substance of the present invention can selectively separate magnetically attractable materials such as iron and stainless steel.

<Other Steps>

The other steps are not particularly limited and may be appropriately selected in accordance with the intended purpose.

Example Embodiment

Here, an example embodiment of the recovering method for a lithium ion secondary battery of the present invention will be described. The present embodiment is an example in which a lithium ion secondary battery is selected as the target.

In the present embodiment, first, the lithium ion secondary battery as the target is placed in a drum serving as the target storing unit. A plurality of holes having a size through which the lithium ion secondary battery does not fall are opened in the drum, and a receptacle into which to recover aluminum is disposed below the drum.

Using a fixed bed furnace as illustrated in FIG. 1 in which burners serving as the flame radiating units are disposed on the gas heating section of the supporting unit bilaterally symmetrically with respect to the drum with one burner on the left-hand side and one burner on the right-hand side, respectively, flames are radiated from the burners in an approximately horizontal direction such that the drum is not contacted by the flames. In this way, the gas positioned in the gas heating section is heated. The gas heated by the flames ascends and mixes into the furnace, to thereby thermally treat the lithium ion secondary battery uniformly and obtain a thermally treated product of the lithium ion secondary battery.

Moreover, during the thermal treatment, the combustion state of the lithium ion secondary battery is observed to judge whether combustion of the lithium ion secondary battery has finished or not. When it is judged that combustion of the lithium ion secondary battery has finished, the thermal treatment is terminated.

Furthermore, during the thermal treatment, the lithium ion secondary battery is thermally treated at 750° C. or higher and lower than 1,085° C., to melt aluminum contained in the lithium ion secondary battery and recover aluminum as a melted product.

Next, the thermally treated product of the lithium ion secondary battery is pulverized to obtain a pulverized product. Subsequently, the pulverized product is classified into a coarse-grained product (oversize product) and a fine-grained product (undersize product). Copper (Cu) is sorted and concentrated into the coarse-grained product (oversize product).

Next, the coarse-grained product (oversize product) is subjected to sorting by a magnetic force (magnetic sorting), to sort the coarse-grained product (oversize product) into magnetically attractable materials and non-magnetically attractable materials. Here, iron (Fe) is sorted and concentrated into the magnetically attractable materials, and copper (Cu), which is a valuable substance, is sorted and concentrated into the non-magnetically attractable materials.

In this way, in the present embodiment, it is possible to recover copper, which is a valuable substance, at a high recovery rate at a high grade while inhibiting deterioration of the container.

EXAMPLES

The present invention will be described below by way of Examples. The present invention should not be construed as being limited to these Examples.

Example 1

<Thermal Treatment>

Square-shaped lithium ion secondary battery cells (approximately 100 kg) of which positive electrode material (positive electrode active substance) was $LiNi_xCo_yMn_zO_2$ (x+y+z=1), of which negative electrode material was carbon (graphite), and of which exterior cases were formed of aluminum were used as the target.

Next, a drum serving as the target storing unit was packed with the lithium ion secondary battery cells specified above. A plurality of holes having a size through which the lithium ion secondary batteries would not fall were opened in the drum, and a receptacle into which to recover aluminum was disposed below the drum.

A fixed bed furnace (having external dimensions of 2,800 mm×3,000 mm and a height of 5,300 mm) as illustrated in FIG. 1A to FIG. 1D was used as the roasting furnace.

In the fixed bed furnace as illustrated in FIG. 1A to FIG. 1D, the drum and the receptacle were placed on a lattice-shaped roasting furnace receiving seat serving as the supporting section of the supporting unit, and burners serving as the flame radiating units were disposed on the gas heating section of the supporting unit bilaterally symmetrically with respect to the drum, with one burner on the left-hand side and one burner on the right-hand side, respectively. Using this fixed bed furnace, a flame was radiated from a burner corresponding to the burner on the left-hand side of FIG. 1A in an approximately horizontal direction such that the drum would not be contacted by the flame radiated from the burner, to thereby perform the thermal treatment. That is, in Example 1, the thermal treatment was performed with one burner. In Example 1, the burner had a tubular member one end of which was opened, and the flame was radiated such that the flame would not go outside the tubular member.

The temperature inside the fixed bed furnace was set to approximately 800° C. The lithium ion secondary batteries were thermally treated by temperature elevation to approximately 800° C. in 30 minutes and retention at approximately 800° C. for 3 hours.

<Pulverization and Classification>

Next, using a hammer crasher (MAKINO-TYPE SWING HAMMER CRUSHER HC-20-3.7, obtained from Makino Mfg. Co., Ltd.) as a pulverizer, the thermally treated lithium ion secondary batteries (thermally treated product of the lithium ion secondary batteries) were pulverized at 50 Hz (at a hammer circumferential speed of 38 m/s) with a punching metal hole diameter of 10 mm at the outlet, to obtain a pulverized product of the lithium ion secondary batteries.

Next, using a sieve having a mesh size (classification point) of 1.2 mm (with a diameter of 200 mm, obtained from Tokyo Screen Co., Ltd.), the pulverized product of the lithium ion secondary batteries was sieved (classified). After sieving, the oversize product (coarse-grained product) and the undersize product (fine-grained product) above and below the 1.2 mm sieve were collected, respectively.

<Magnetic Force Sorting>

Next, using a drum-shaped dry magnetic sorter (CC 15"Φ×20"W, obtained from Eriez Magnetics Japan Co., Ltd.) having a magnetic flux density of 1,500 G (0.15 T), the obtained coarse-grained product was subjected to magnetic force sorting at a feed rate of 0.5 kg/minute, to thereby separate and recover magnetically attractable materials and non-magnetically attractable materials.

Example 2

Magnetically attractable materials and non-magnetically attractable materials were separated and recovered in the same manner as in Example 1, except that unlike in Example 1, the thermal treatment was performed by radiating flames from the burners corresponding to the two burners on the left and right-hand sides of FIG. 1A and FIG. 1B in an approximately horizontal direction. That is, in Example 2, using the burners serving as the flame radiating units and disposed bilaterally symmetrically with respect to the drum, with one burner on the left-hand side and one burner on the right-hand side, respectively, the thermal treatment was performed by radiating flames from both of the left and right-hand side burners in an approximately horizontal direction.

Example 3

Magnetically attractable materials and non-magnetically attractable materials were separated and recovered in the same manner as in Example 2, except that unlike in Example 2, whether ignition of the lithium ion secondary batteries inside the drum had finished or not was judged using a camera that displayed the internal view inside the cylindrical fixed bed furnace, and when it was judged that ignition of the lithium ion secondary batteries had finished, the burning operation of the burners (radiation of flames) was stopped.

In Example 3, extinction of ignition of the lithium ion secondary batteries was confirmed based on a camera image reflecting the internal view inside the furnace, to thereby judge whether combustion of the lithium ion secondary batteries had finished or not.

In Example 3, ignition of the lithium ion secondary batteries inside the drum finished in approximately 1 hour from when the temperature (thermal treatment temperature) inside the cylindrical fixed bed furnace reached approximately 800° C. Hence, the burning operation of the burners was stopped at the instant.

Comparative Example 1

Magnetically attractable materials and non-magnetically attractable materials were separated and recovered in the same manner as in Example 3, except that unlike in Example 1, the thermal treatment was performed for 1 hour (with retention at approximately 800° C. for 1 hour) without use of the supporting unit, i.e., with the drum disposed at a position at which the drum would be directly contacted by a flame radiated from the burner inside the fixed bed furnace.

<Evaluation>

<<Drum Condition after Thermal Treatment>>

The drum (an example of the target storing unit) after the thermal treatment was evaluated as "C" when the drum was bored (broken) by a diameter (φ) of 5 mm or greater, "B" when the drum was deformed by 5 mm or greater, and "A" when the drum was not bored (broken) and was deformed by less than 5 mm.

<<Recovery Rate and Grade>>

The masses of the fine-grained product, the magnetically attractable materials, and the non-magnetically attractable materials obtained were measured using an electromagnetic balance (product name: GX-8K, obtained from A&D Company, Limited). Subsequently, leaching residues obtained when the magnetically attractable materials and the non-magnetically attractable materials were leached into leaching liquids respectively were heated and dissolved in aqua regia (obtained from FUJIFILM Wako Pure Chemical Corporation), and analyzed by an inductively coupled high-frequency plasma emission spectrometer (ICAP6300, obtained from Thermo Fisher Scientific K.K.), to obtain the content percentages (grades) of copper in the fine-grained product, the magnetically attractable materials, and the non-magnetically attractable materials. In addition, the weight percentage (%) of copper recovered into the non-magnetically attractable materials when the weight of copper contained in all of these products was seen to be 100 was evaluated as the recovery rate of copper.

The condition of the drum (drum condition) after the thermal treatment, and the recovery rate of copper (Cu) and the grade of copper (Cu) in the non-magnetically attractable materials of the coarse-grained product in Example 1, Example 2, Example 3, and Comparative Example 1 are presented in Table 1.

TABLE 1

| | Drum condition | Copper recovery rate (%) | Copper grade (%) |
|---|---|---|---|
| Ex. 1 | B | 90 | 78 |
| Ex. 2 | B | 80 | 87 |
| Ex. 3 | A | 86 | 89 |
| Comp. Ex. 1 | C | 14 | 63 |

As presented in Table 1, in Examples 1 to 3, deterioration of the drum was inhibited and the drum was not broken, the recovery rate of copper into the non-magnetically attractable materials of the coarse-grained product was 80% or higher, and the grade of copper in the non-magnetically attractable materials of the coarse-grained product was 75% or higher. As can be seen, in Examples 1 to 3, it was possible to inhibit deterioration of the drum, and to thermally treat the target uniformly and recover copper, which was an example of the valuable substance, at a high recovery rate at a high grade.

In Example 2 in which burners serving as the flame radiating units were disposed bilaterally symmetrically with respect to the drum with one burner on the left-hand side and one burner on the right-hand side, respectively, and the thermal treatment was performed by radiating flames from both of the left and right-hand side burners in an approximately horizontal direction, a notable improvement was seen in the grade of copper recovered. In Example 3 in which whether ignition of the lithium ion secondary batteries inside the drum had finished or not was judged, and the burning operation of the burners (radiation of flames) was stopped when it was judged that ignition of the lithium ion secondary batteries had finished, it was possible to better inhibit deterioration of the drum.

On the other hand, in Comparative Example 1, because the drum was deteriorated and broken and copper (Cu) current collectors of the lithium ion secondary batteries were oxidized and embrittled, the recovery rate of copper into the coarse-grained product was low, and the recovery rate of copper into the non-magnetically attractable materials was lower than 15% as a result.

As described above, the method for recovering a valuable substance of the present invention includes: a thermal treatment step of thermally treating a target containing a valuable substance while supporting a target storing unit, in which the target is stored, by a supporting unit that can support the target storing unit, wherein the thermally treating includes heating a gas present in a region, in which the supporting unit is positioned, by a flame for thermally treating the target such that the target storing unit is not contacted by the flame; and a valuable substance recovering step of recovering the valuable substance from a thermally treated product of the target obtained in the thermal treatment step.

Hence, the method for recovering a valuable substance of the present invention can inhibit deterioration of a target storing unit in which a target containing a valuable substance is stored, and can thermally treat the target uniformly and recover the valuable substance at a high recovery rate at a high grade.

REFERENCE SIGNS LIST

10: gas heating section
11: burner
12: supporting section (receiving seat)
13: projection
14: flame radiating outlet
15: flame
16: partition
20: target storing unit
21: receptacle
100: fixed bed furnace

The invention claimed is:

1. A method for recovering a valuable substance, the method comprising:

thermally treating a target containing a valuable substance while supporting a target storing unit, in which the target is stored, by a supporting unit that can support the target storing unit, wherein the thermally treating includes heating a gas present in a region, in which the supporting unit is positioned, by a flame for thermally treating the target such that the target storing unit is not contacted by the flame; and recovering the valuable substance from a thermally treated product obtained by thermally treating the target, wherein, in the thermally treating, by directing the flame in an approximately horizontal direction by using two burners below the target storing unit, the target is heated by causing a heated gas to rise while preventing the flame from contacting the target storing unit, wherein, when the two burners are viewed from above the target storing unit, and when one of the two burners is disposed on an upper left side, the other burner of the two burners is disposed on a lower right side, and a partition is provided between the one burner of the two burners and the other burner of the two burners.

2. The method for recovering a valuable substance according to claim 1, wherein each burner of the two burners has a tubular member that is configured to radiate the flame and at least one end of which is open, and the burner radiates the flame such that the flame does not go outside the tubular member.

3. The method for recovering a valuable substance according to claim 1, wherein the target storing unit is placeable on the supporting unit, and the thermally treating is performed while the target storing unit is placed on the supporting unit.

4. The method for recovering a valuable substance according to claim 1, wherein the target storing unit is formed of iron or stainless steel.

5. The method for recovering a valuable substance according to claim 1, wherein in the thermally treating, the target is thermally treated at 750° C. or higher and lower than 1,085° C.

6. The method for recovering a valuable substance according to claim 1, wherein the target is a lithium ion secondary battery.

7. The method for recovering a valuable substance according to claim 6, wherein the lithium ion secondary battery has a housing containing aluminum, and in the thermally treating, the aluminum of the housing of the lithium ion secondary battery is melted and a melted product is separated.

8. The method for recovering a valuable substance according to claim 6, wherein the valuable substance contains copper.

9. The method for recovering a valuable substance according to claim 6, wherein in the thermally treating, a combustion state of the lithium ion secondary battery is observed to judge whether combustion of the lithium ion secondary battery has finished or not, and when it is judged that combustion of the lithium ion secondary battery has finished, the thermally treating is terminated.

10. The method for recovering a valuable substance according to claim 1, wherein the recovering the valuable substance includes:

pulverizing the thermally treated product, to obtain a pulverized product;

classifying the pulverized product at a classification point that is greater than or equal to 0.6 mm and less than or equal to 2.4 mm, to obtain a coarse-grained product, a size of the coarse-grained product being larger than or equal to the classification point, and a fine-grained product, a size of the fine-grained product being smaller than the classification point; and sorting the coarse-grained product using a magnet having a magnetic flux density of 0.03 tesla or higher.

* * * * *